(12) United States Patent
Kwon et al.

(10) Patent No.: US 10,390,292 B2
(45) Date of Patent: Aug. 20, 2019

(54) DEVICE, SYSTEM AND METHOD OF QUASI-ORTHOGONAL MULTIPLE ACCESS

(71) Applicant: Intel IP Corporation, Santa Clara, CA (US)

(72) Inventors: Hwan-Joon Kwon, Portland, OR (US); Jong-Kae Fwu, Sunnyvale, CA (US); Gang Xiong, Beaverton, OR (US); Debdeep Chatterjee, San Jose, CA (US); Abhijeet Bhorkar, Fremont, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/553,363

(22) PCT Filed: Oct. 19, 2015

(86) PCT No.: PCT/US2015/056152
§ 371 (c)(1),
(2) Date: Aug. 24, 2017

(87) PCT Pub. No.: WO2016/153555
PCT Pub. Date: Sep. 29, 2016

(65) Prior Publication Data
US 2018/0124684 A1    May 3, 2018

Related U.S. Application Data

(60) Provisional application No. 62/138,892, filed on Mar. 26, 2015.

(51) Int. Cl.
*H04W 4/70* (2018.01)
*H04W 72/04* (2009.01)
(Continued)

(52) U.S. Cl.
CPC .............. *H04W 48/10* (2013.01); *H04J 15/00* (2013.01); *H04L 5/0023* (2013.01);
(Continued)

(58) Field of Classification Search
CPC ............. H04W 48/10; H04W 72/0493; H04W 28/0247; H04W 76/27; H04L 5/0023; H04L 5/0037; H04L 5/0057
See application file for complete search history.

(56) References Cited

U.S. PATENT DOCUMENTS

| 7,072,410 | B1 * | 7/2006 | Monsen | ............... H04B 7/0408 370/335 |
| 7,668,564 | B2 * | 2/2010 | Onggosanusi | ...... H04W 52/146 370/318 |

(Continued)

FOREIGN PATENT DOCUMENTS

| CN | 107258067 | 10/2017 |
| GB | 2454198 | 5/2009 |

(Continued)

OTHER PUBLICATIONS

"International Application Serial No. PCT/US2015/056152, International Preliminary Report on Patentability dated Oct. 5, 2017", 7 pgs.

(Continued)

*Primary Examiner* — Rasheed Gidado
(74) *Attorney, Agent, or Firm* — Schwegman Lundberg & Woessner, P.A.

(57) ABSTRACT

An eNodeB (eNB), user equipment (UE) and method of providing a quasi-orthogonal multiple access (QOMA) resources are generally described. The UE receives allocation of orthogonal multiple access (OMA) and non-OMA (NOMA) resources. The UE transmits data up to a maximum NOMA rate and NOMA Modulation and Coding (Continued)

Scheme (MCS) using the NOMA resources without receiving an explicit transmission grant from the eNB. The eNB may allocate multiple NOMA regions associated with different maximum rates, MCSs, number of UEs, UE types, applications and sizes. If the data exceeds the NOMA conditions or the UE is unable to transmit data using the allocated NOMA resources or does not receive an acknowledgement from the eNB regarding reception of the transmitted data, the UE may request an explicit grant of the OMA resources from the eNB and, upon receiving an allocation of the OMA resources, subsequently transmit the data using the allocated OMA resources.

22 Claims, 3 Drawing Sheets

(51) Int. Cl.

| | | |
|---|---|---|
| H04W 24/10 | (2009.01) | |
| H04W 48/10 | (2009.01) | |
| H04W 76/27 | (2018.01) | |
| H04L 5/00 | (2006.01) | |
| H04W 28/02 | (2009.01) | |
| H04J 99/00 | (2009.01) | |
| H04L 25/02 | (2006.01) | |
| H04L 27/26 | (2006.01) | |

(52) U.S. Cl.
CPC .......... *H04L 5/0028* (2013.01); *H04L 5/0037* (2013.01); *H04L 5/0044* (2013.01); *H04L 5/0064* (2013.01); *H04L 5/0092* (2013.01); *H04W 28/0247* (2013.01); *H04W 72/044* (2013.01); *H04W 72/0493* (2013.01); *H04W 76/27* (2018.02); *H04L 5/0016* (2013.01); *H04L 5/0055* (2013.01); *H04L 5/0087* (2013.01); *H04L 5/0096* (2013.01); *H04L 25/0228* (2013.01); *H04L 27/2602* (2013.01)

(56) References Cited

U.S. PATENT DOCUMENTS

| | | | |
|---|---|---|---|
| 8,446,892 B2* | 5/2013 | Ji | H04B 1/7143 370/329 |
| 2007/0291634 A1* | 12/2007 | Kwon | H04B 1/707 370/208 |
| 2010/0238902 A1 | 9/2010 | Ji et al. | |
| 2014/0029562 A1 | 1/2014 | Kishiyama | |
| 2014/0146754 A1 | 5/2014 | Bayesteh et al. | |
| 2015/0043540 A1 | 2/2015 | Nikopour et al. | |

FOREIGN PATENT DOCUMENTS

| | | |
|---|---|---|
| JP | 2009522916 A | 6/2009 |
| WO | WO-2010053253 A1 | 5/2010 |
| WO | WO-2015015543 A1 | 2/2015 |
| WO | 2015167714 | 11/2015 |

OTHER PUBLICATIONS

"European Application Serial No. 15886704.4, Extended European Search Report dated Oct. 24, 2018", 11 pgs.

"International Application Serial No. PCT/US2015/056152, International Search Report dated Jan. 29, 2016", 4 pgs.

"International Application Serial No. PCT/US2015/056152, Written Opinion dated Jan. 29, 2016", 5 pgs.

NTT DOCOMO, "Justification for NOMA in New Study on Enhanced MU-MIMO and Network Assisted Interference Cancellation", RP-141165, 3GPP TSG RAN Meeting #65, [Online] retrieved from the internet: <http://www.3gpp.org/ftp/tsg_ran/TSG_RAN/TSGR_65/Docs/>, (Sep. 2, 2014).

"European Application Serial No. 15886704.4, Response Filed May 20, 2019 to Extended European Search Report dated Oct. 24, 2018", 28 pgs.

"Japanese Application Serial No. 2017-540890, Notification of Reasons for Refusal dated Jun. 11, 2019", W/ English Translation, 34 pgs.

* cited by examiner

DEVICE, SYSTEM AND METHOD OF QUASI-ORTHOGONAL MULTIPLE ACCESS

PRIORITY CLAIM

This application is a U.S. National Stage Filing under 35 U.S.C. 371 from International Application No. PCT/US2015/056152, filed Oct. 19, 2015 and published in English as WO 2016/153555 on Sep. 29, 2016, which claims the benefit of priority to U.S. Provisional Patent Application Ser. No. 62/138,892, filed Mar. 26, 2015, and entitled "QUASI-ORTHOGONAL MULTIPLE ACCESS," each of which is incorporated herein by reference in its entirety.

TECHNICAL FIELD

Embodiments pertain to radio access networks. Some embodiments relate to multiple access schemes in cellular networks, including Third Generation Partnership Project Long Term Evolution (3GPP LTE) networks and LTE advanced (LTE-A) networks as well as $4^{th}$ generation (4G) networks and $5^{th}$ generation (5G) networks.

BACKGROUND

The use of personal communication devices has increased astronomically over the last two decades. The penetration of mobile devices in modern society has continued to drive demand for a wide variety of networked devices in a number of disparate environments. The use of networked devices using 3GPP LTE systems has increased in all areas of home and work life.

In many instances, it is desirable to allow various communication devices, including user equipment (UEs) and enhanced Node Bs (eNB), to simultaneously communicate using multiple access schemes to improve system capacity. A number of such multiple access schemes and waveforms (e.g., Orthogonal Frequency Division Multiplexing (OFDM), Discrete Fourier Transform-Spread-Orthogonal Frequency Division Multiplexing (GI-DFT-s-OFDM), single carrier (SC), etc.) may permit concurrent data transfer of multiple types between the network (e.g., eNB) and UE or between different UEs (device-to-device, also called D2D). Rather than being designed for a particular modulation scheme or waveform however, communication systems may be flexible enough to ensure operation with different types of modulation schemes and waveforms.

In the US, the current generation of systems is 3GPP 4G standard LTE. Efforts have already begun on developing the next 3GPP (5G) generation system. It may thus be desirable to provide a downward-compatible 3GPP 5G multiple access scheme that provides relatively high capacity, low latency, and low control overhead while taking into account receiver complexity.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
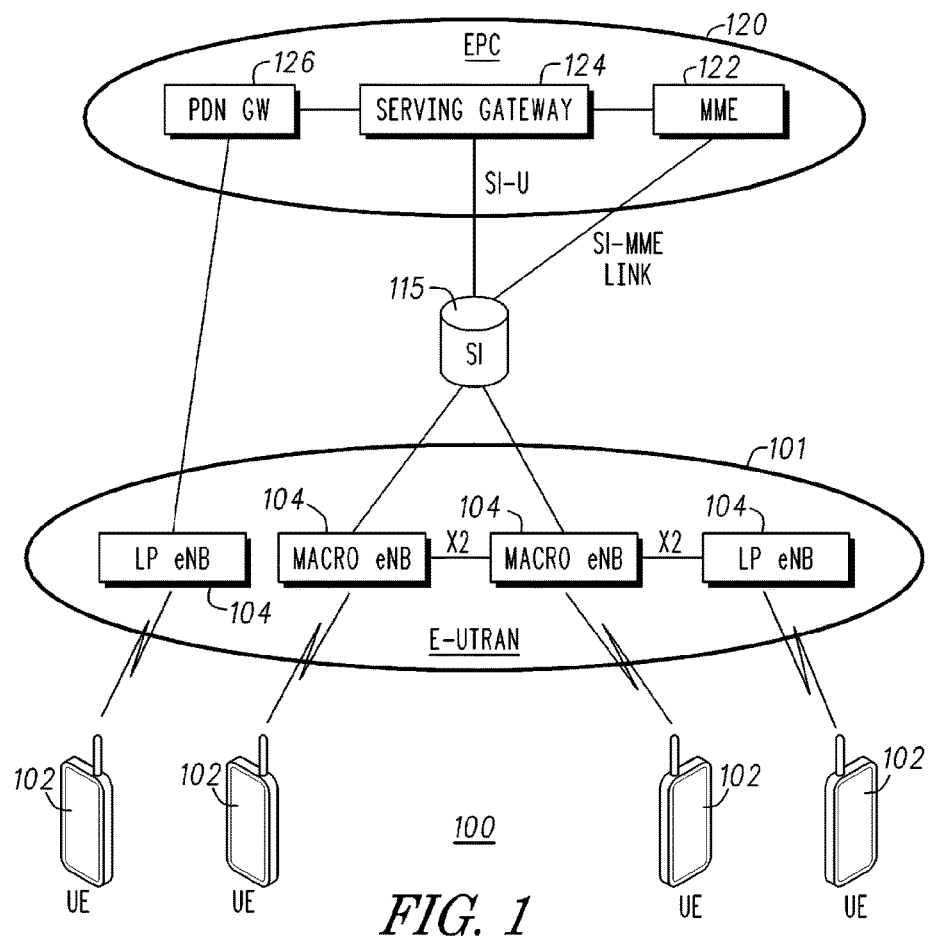
FIG. 1 is a functional diagram of a 3GPP network in accordance with some embodiments.

FIG. 1 is a functional diagram of a 3GPP network in accordance with some embodiments. The network may comprise a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes eNBs 104 (which may operate as base stations) for communicating with UE 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes traffic packets (such as data packets or voice packets) between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates a SGi interface toward the packet data network (PDN). The PDN GW 126 routes traffic packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. The eNBs 104 may communicate both with UEs 102 in a normal coverage mode and UEs 104 in one or more enhanced coverage modes. In some embodiments, an eNB 104 may fulfill various logical functions for the RAN 100 including but not limited to RNC (radio network controller functions) such as radio bearer management, uplink and downlink dynamic radio resource management and traffic packet scheduling, and mobility management. In accordance with some embodiments, UEs 102 may be configured to communicate via orthogonal multiple access (OMA) communications such as Time Division Multiple Access (TDMA), Frequency Division Multiple Access (FDMA) Orthogonal FDMA (OFDMA), SC-FDMA or other communication signals with an eNB 104 over a multicarrier communication channel in accordance with the appropriate communication technique. The OFDM signals may comprise a plurality of orthogonal subcarriers. In accordance with some embodiments, UEs 102 may be configured to communicate via non-orthogonal multiple access (NOMA) signals.

The S1 interface 115 is the interface that separates the RAN 100 and the EPC 120. It is split into two parts: the S1-U, which carries traffic packets between the eNBs 104 and the serving GW 124, and the S1-MME, which is a signaling interface between the eNBs 104 and the MME 122.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

Communication over an LTE network may be split up into 10 ms frames, each of which may contain ten 1 ms subframes. Each subframe of the frame, in turn, may contain two slots of 0.5 ms. The eNB may schedule uplink and downlink transmissions over a variety of frequency bands. The allocation of resources in subframes used in one frequency band and may differ from those in another frequency band. Each slot of the subframe may contain 6-7 symbols, depending on the system used. In some embodiments, the subframe may contain 12 or 24 subcarriers. A resource grid may be used for downlink and uplink transmissions between an eNB and a UE. The resource grid may be a time-frequency grid, which is the physical resource in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE in the current 3GPP standard. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block, dependent on the system bandwidth. The duration of the resource grid in the time domain corresponds to one subframe or two resource blocks. Each resource grid may comprise 12 (subcarriers)*14 (symbols)=168 resource elements for normal cyclic prefix (CP) case. Several different physical channels may be conveyed using such resource blocks.

There may be several different physical downlink channels that are conveyed using such resource blocks, including the physical downlink control channel (PDCCH) and the physical downlink shared channel (PDSCH). Each subframe may contain a PDCCH, physical hybrid-ARQ indicator channel (PHICH), physical control format indicator channel (PCFICH) and the PDSCH. The PDCCH may normally occupy the first up to three symbols (four in the case of narrow bandwidths of 1.4 MHz) of each subframe and carry, among other things, information about the transport format and resource allocations related to the PDSCH channel and uplink scheduling grants for a physical uplink shared channel (PUSCH) transmission. The PHICH may be used to signal HARQ information in response to a PUSCH transmission. The PCFICH may inform the UE the control region size (e.g. one, two or three OFDM symbols) in each downlink subframe. The PDSCH may carry user data and higher layer signaling to a particular UE and occupy the remainder of the downlink subframe to avoid the resources in which downlink control channels (PDCCH/PHICH/PCFICH) are transmitted. Typically, downlink scheduling (assigning control and shared channel resource blocks to UEs within a cell) may be performed at the eNB based on channel quality information provided by the UEs, and then the downlink resource assignment information may be sent to a scheduled UE on the PDCCH used for (assigned to) PDSCH reception of the UE.

The PDCCH may contain downlink control information (DCI) in one of a number of formats that tell the UE where to find and how to decode the data, transmitted on PDSCH in the same subframe, from the resource grid. The DCI may provide details such as the number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the RNTI, which may be UE-specific, may limit decoding of the DCI information (and hence the corresponding PDSCH) to only the intended UE. The PDCCH may be located in any of a number of frequency/temporal regions, depending on whether the PDCCH is UE-Specific or common, as well as the aggregation level. The set of possible candidate locations for the PDCCH is defined in terms of search spaces. A search space is defined by a set of Control Channel Element (CCE) candidates with a number of aggregation level $L \in \{1,2,4,8\}$ where the UE may monitor to find its PDCCHs. A common search space may carry DCIs that are common for all UEs; for example, system information (using the SI-RNTI), paging (P-RNTI), PRACH responses (RA-RNTI), or UL TPC commands (TPC-PUCCH/PUSCH-RNTI). A UE-specific search space may carry DCIs for UE-specific allocations using a Cell Radio-Network Temporary Identifier (C-RNTI) assigned to the UE, a semi-persistent scheduling (SPS C-RNTI), or an initial allocation (temporary C-RNTI). When configuring an SPS (either uplink or downlink), the SPS C-RNTI is provided by the eNB and the UE is configured by higher layers to decode a PDCCH with a CRC scrambled by the SPS C-RNTI. The UE may monitor the PDCCH having a CRC scrambled by the SPS C-RNTI in every subframe as the eNB can activate/re-activate/release the SPS at any time using a DCI format with a CRC scrambled by an SPS C-RNTI. The received DCI format with a CRC scrambled by the SPS C-RNTI can be a grant/assignment for a retransmission or for activation/re-activation/release of the SPS. 3GPP Technical Specification 36.213 has tabulated the validation procedure for activation/re-activation/release of SPS.

In addition to the PDCCH, an enhanced PDCCH (EPDCCH) may be used by the eNB and UE. The PDSCH may thus contain data in some of the resource blocks (RBs) and then EPDCCH contains the downlink control signals in others of the RBs of the bandwidth supported by the UE. Different UEs may have different EPDCCH configurations. The sets of RBs corresponding to EPDCCH may be configured, for example, by higher layer signaling such as Radio Resource Control (RRC) signaling for EPDCCH monitoring.

The Physical Uplink Control Channel (PUCCH) may be used by the UE to send Uplink Control Information (UCI) to the eNB. The PUCCH may be mapped to an UL control channel resource defined by an orthogonal cover code and two resource blocks (RBs), consecutive in time, with hopping potentially at the boundary between adjacent slots. The PUCCH may take several different formats, with the UCI containing information dependent on the format. Specifically, the PUCCH may contain a scheduling request (SR), acknowledgement responses/retransmission requests (ACK/NACK) or a Channel Quality Indication (CQI)/Channel State Information (CSI). The CQI/CSI may indicate to the eNB an estimate of the current downlink channel conditions as seen by the UE to aid channel-dependent scheduling and, if one MIMO transmission mode is configured to the UE, may include MIMO-related feedback (e.g. Precoder matrix indication, PMI).

Figure 2:
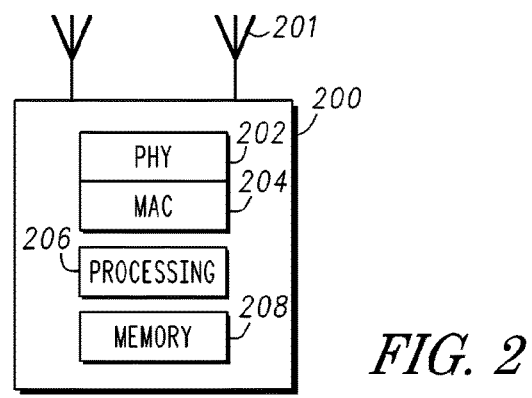
FIG. 2 is a block diagram of a 3GPP device in accordance with some embodiments.

FIG. 2 is a functional diagram of a 3GPP device in accordance with some embodiments. The device may be a UE or eNB, for example. In some embodiments, the eNB may be a stationary non-mobile device. The 3GPP device 200 may include physical layer circuitry 202 for transmitting and receiving signals using one or more antennas 201. The 3GPP device 200 may also include medium access control layer (MAC) circuitry 204 for controlling access to the wireless medium. The 3GPP device 200 may also include processing circuitry 206 and memory 208 arranged to perform the operations described herein.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a sensor, a medical device (e.g., a heart rate monitor, a blood pressure monitor, etc.), or other device that may receive and/or transmit information wirelessly. In some embodiments, the mobile device or other device can be a UE 102 or eNB 104 configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

The antennas 201 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201 may be effectively separated to take advantage of spatial diversity and the different channel characteristics that may result.

Although the 3GPP device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The term "machine readable medium" may include a single medium or multiple media (e.g., a centralized or distributed database, and/or associated caches and servers) configured to store one or more instructions. The term "machine readable medium" may include any medium that is capable of storing, encoding, or carrying instructions for execution by the 3GPP device 200 and that cause it to perform any one or more of the techniques of the present disclosure, or that is capable of storing, encoding or carrying data structures used by or associated with such instructions. The term "transmission medium" shall be taken to include any intangible medium that is capable of storing, encoding or carrying instructions for execution, and includes digital or analog communications signals or other intangible medium to facilitate communication of such software.

As above, present networks are designed to operate using different types of access schemes. These access schemes may be classified into non-orthogonal multiple access (NOMA) schemes and orthogonal multiple access (OMA) schemes. Examples of OMA schemes include TDMA, FDMA, OFDMA and SC-FDMA, among others; while examples of NOMA schemes include 3G CDMA uplinks such as a Wideband Code Division Multiple Access (WCDMA) or High Speed Packet Access (HSPA) uplinks, superposition coding (e.g., Rel-13 NOMA), and the like. In an OMA scheme, UE multiplexing within a cell may be realized by assigning orthogonal resources to different UEs. In contrast, in a NOMA scheme, UE multiplexing within a cell may be realized by assigning non-orthogonal resources to different UEs. In a NOMA scheme, the resources assigned to different UEs are not orthogonal with each other and thus transmissions from the UEs may interfere with each other by arriving on the same resource. The eNB may use spreading codes. One performance-limiting factor of OMA schemes may be the limited number of orthogonal basis vectors (e.g., the number of time slots in TDMA systems and the number of subcarriers in OFDMA systems), while a similar performance-limiting factor of NOMA schemes may be the total received signal power (depending on the receiver structure) such that a set maximum number of UEs may be able to communicate with the eNB.

It would be desirable to provide an improved multiplex access scheme for use in next generation (5G) communication systems. One such scheme may be referred to as a Quasi-Orthogonal Multiple Access (QOMA) scheme and may combine OMA and NOMA schemes. A QOMA scheme may contain QOMA resources that include both OMA and NOMA resources. In a QOMA scheme, an eNB may assign different types of resources to different UEs, and the UE may communicate using different resources (e.g., OMA or NOMA) depending on one or more of a number of factors including the type of communication. For example, OFDM and other OMA schemes, and corresponding OMA resources, may be used for relatively large packet number/high rate transmissions such as File Transfer Protocol (FTP) and Ultra High Definition (U-HD) video traffic. NOMA schemes and corresponding NOMA resources, on the other hand, may be used for relatively small packet number or low rate transmissions such as voice over IP (VoIP), gaming, higher layer signaling, and machine type communications (MTC), among others. While the capacity of OMA schemes may typically be lower than NOMA schemes, the capacity loss of the OMA scheme may be marginal as long as an OMA scheme is used for high rate transmissions in which the operating signal-to-interference-plus-noise ratio (SINR) is typically large.

In some embodiments, the eNB may configure multiple temporal and/or spectral regions or zones (i.e., sets of resource elements) with which the UEs attached to the eNB may communicate using the different communication schemes. The regions may each comprise one or more resource blocks, each comprising a plurality of resource elements. The regions may be statically (e.g., based on average packet arrival time, which is typically random) or semi-statistically (e.g., based on short term packet/UE conditions on the order of seconds) configured by the eNB to operate in a time-division multiplexing (TDM) and/or frequency-division multiplexing (FDM) manner. The number and placement of NOMA regions in the overall eNB resources available may be determined by the eNB dependent on the number of UEs, the predicted use of the overall resources by the UEs (e.g., the applications operating on the UEs) and other factors, such as Quality of Service (QoS) factors desired by the UEs. The eNB resources for communication with UEs comprise the OMA and NOMA resources. The configuration of NOMA regions (and therefore OMA regions) in the time and/or frequency domain may be predefined or provided to one or more of the UEs attached to the eNB by higher layer signaling such as via a master information block (MIB), system information block (SIB), or UE-specific dedicated RRC signaling.

Once the eNB determines the number and type of regions, the eNB may allocate the appropriate resources to each UE. Once the resources are allocated, the eNB may communicate with each UE indicating one or more of the assigned OMA and/or NOMA regions. For example, in some embodiments the eNB may communicate only NOMA resources, only OMA resources, or both NOMA and OMA resources. The eNB may allocate a single NOMA region to multiple attached UEs to allow these UEs to use the NOMA region when desired without specifically first requesting specific use of the NOMA resources from the eNB, as OMA resources. The eNB, in addition to communicating the resources, may also communicate additional communication information, such as data rate, to be used by the UE when communicating using the resources. The communication information may be provided to the UE concomitantly with or subsequent to the resource communication. In some embodiments in which resources of only one type (e.g., NOMA resources) are provided to a particular UE, the remaining resources may be determined by the UE to be reserved for resources of another type (e.g., OMA). In some embodiments, the resources received by the eNB may be in addition to those assigned by other means, such as those predefined in a SIB or MIB. For example, certain NOMA resources may be predefined and other NOMA resources may be provided by the eNB.

After the UE receives the allocation of the NOMA resources and transmission rate, unlike OMA-type communications, the UE may be able to use the NOMA resources to transmit data at or below the assigned NOMA rate via the NOMA region without an additional explicit grant from the eNB. In other words, the UE may be able to transmit the data without requesting an explicit grant for transmission of that data from the eNB. In some embodiments, by using NOMA resources that have already been allocated, communication latency and control overhead may be reduced. In some embodiments, the UE may periodically request, or otherwise receive from the eNB, updated resources. This update may be on the order of hundreds of milliseconds, several seconds or longer. For example, the application being used by the UE may change, resulting in the UE either no longer desiring to use NOMA resources or desiring to use NOMA resources instead of OMA resources. Alternately, changes in the number of UEs and/or type of communications used by the existing UEs may change, resulting in the eNB adjusting the ratio of OMA/NOMA resources in the overall resources available. The updated NOMA resources may be different from the previously assigned NOMA resources or may be the same. In some embodiments, the UE may only receive updated assigned NOMA resources if the NOMA resources are to change. The allocation of NOMA resources may thus be performed during an initial access procedure or predefined using the above control signaling such as a SIB/MIB. It can also be updated, e.g., via higher layer signaling.

In some embodiments, a UE having been allocated NOMA resources may request an explicit grant for OMA resources when the UE desires to use resources to transmit data at a higher rate or large packet size than the assigned NOMA rate. The UE may request explicit resources such as physical resource blocks (PRBs) or Modulation and Coding Schemes (MCSs) or leave the assignment of the OMA resources to the eNB. The OMA resources may replace or supplement the NOMA resources already allocated to the UE. In some embodiments, NOMA resources that have been replaced by OMA resources may be re-allocated by the eNB to another UE after indicating grant of the OMA resources to the UE. The grant may serve as a notification to the UE of re-allocation of the NOMA resources or the eNB may provide a separate control signal to the UE indicating the re-allocation.

Figure 3:
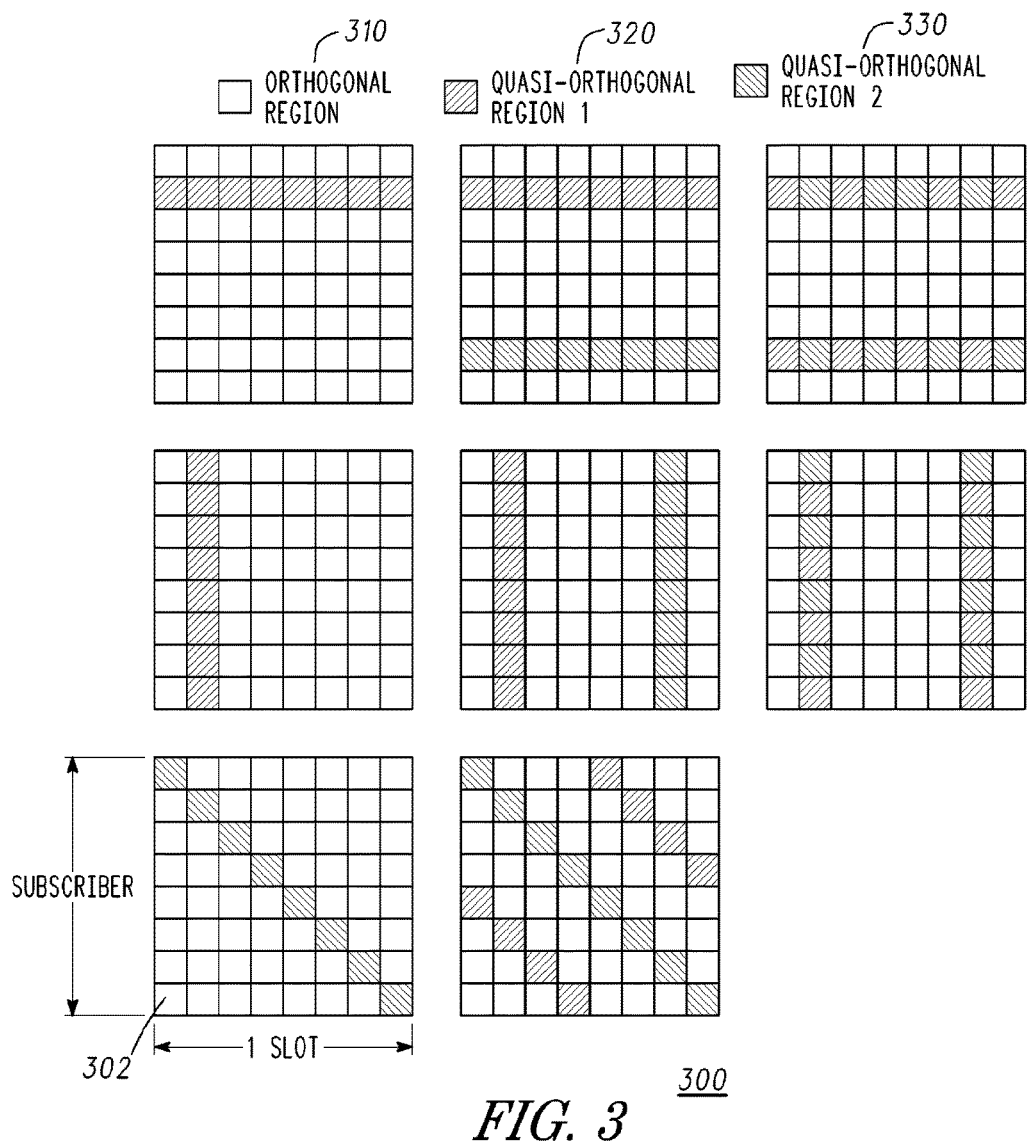
FIG. 3 illustrates examples of Quasi-Orthogonal Multiple Access (QOMA) regions in accordance with some embodiments.

FIG. 3 illustrates examples of Quasi-Orthogonal Multiple Access (QOMA) regions in accordance with some embodiments. As shown, each resource region 300 may include a plurality of resource elements 302 designed into an orthogonal resource (OMA) region 310 and one or more non-orthogonal resource (NOMA) regions 320, 330. Each resource region 300 shown comprises one slot in time and a subset of subcarriers of a resource block in frequency and is formed by a plurality of resource blocks. The different NOMA regions 320, 330 may take a number of different shapes, only some of the examples of which are shown in FIG. 3. For example, a particular NOMA region 320, 330 may comprise resource elements associated with a single symbol spread over the frequency domain, thereby providing better noise response due to enhanced frequency diversity or resource elements associated with a single subcarrier spread over the time domain within the resource region 300, thereby providing better performance due to enhanced temporal diversity.

In some embodiments, a particular NOMA region 320, 330 may comprise resource elements associated with non-overlapping symbols and subcarriers such that every subcarrier and every symbol is different in the NOMA region, such as that shown in the last two examples in FIG. 3. In some embodiments, a particular NOMA region 320, 330 may comprise resource elements associated with a single symbol or resource elements associated with a single subcarrier, with the different NOMA regions 320, 330 being interleaved. The size of and UEs allocated to each NOMA region 320, 330 may be independent. In one example, the NOMA regions may have the same size (e.g., a single resource block), as shown in FIG. 3, and may have the same maximum number of UEs allocated to each NOMA region. In another example, the NOMA regions may have the same size, and may have a different maximum number of UEs allocated to each NOMA region to permit different bit error rates (BERs) and QoS in the different NOMA regions. Although not shown in FIG. 3, the NOMA regions may have different sizes, e.g., one NOMA region may consist of a single resource block while another NOMA region may consist of a plurality of resource blocks. The NOMA regions may be associated with the same maximum data rate and/or MCS, or one or both the maximum data rate and MCS may vary between the NOMA regions. The number and partition of the NOMA regions may vary with the expected NOMA demand and application type (e.g., desire of the application for latency reduction vs. noise reduction), as determined by the eNB. Thus, a UE may be allocated a particular NOMA region based on, among other factors, the UE type and QoS for the UE and channel conditions.

As above, along with allocating a NOMA region to a particular UE, the eNB may contemporaneously assign to the UE a maximum allowed NOMA rate and/or a maximum allowed Modulation and Coding Scheme (MCS) along with the NOMA resources, e.g., codes and time/frequency allocations. The maximum NOMA rate and/or MCS assigned may vary dependent on the UE, NOMA region and operating conditions, among others. Thus, in some embodiments, different UEs allocated to the NOMA region may transmit at different rates and/or MCSs. In some embodiments, the UE may transmit in the NOMA region using a lower rate and/or MCS (e.g., QPSK and code rate 1/2) than the maximum allocated by the eNB. In some embodiments, multiple NOMA regions may be allocated to the UE, with each NOMA region having a predetermined MCS and/or rate or range of MCS and/or rates. In some embodiments, the UE may request OMA resources if a substantial amount of data is to be transmitted, as contained in an internal queue in a buffer of the transmission path of the UE. In some embodiments, only the OMA, rather than the NOMA, regions may be predefined and/or configured via higher layer signaling. In some embodiment, both the OMA and NOMA regions may be predefined and/or configured via higher layer signaling.

Figure 4:
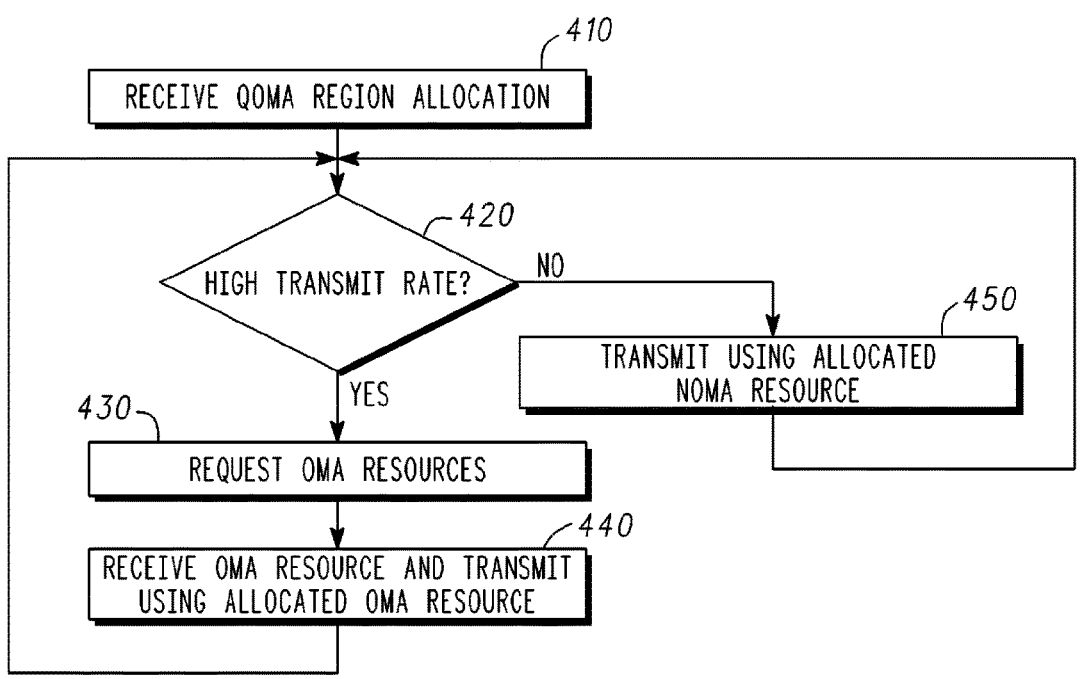
FIG. 4 illustrates a flowchart of a QOMA method in accordance with some embodiments.

FIG. 4 illustrates a flowchart of a QOMA method in accordance with some embodiments. At operation 410, some or all of UEs served by an eNB can be assigned one or more NOMA resources by the eNB. In some embodiments, during an initial access procedure, a UE may initially attach to the network by registering with the MME through the eNB using a non-access stratum (NAS) attach request such as an Initial UE Context Setup Request. In response to the request, the eNB may assign a NOMA resource to the UE. The NOMA resource may include one or more NOMA regions, non-orthogonal codes, and/or all or a part or the assigned NOMA regions.

At operation 420, the UE determines whether data is to be transmitted via the assigned NOMA resources or whether OMA resources are desired to transmit data at a high rate. In the latter case, the UE may request an explicit grant from the eNB for OMA resources. In some embodiments, the data desired to be transmitted by the UE may include L1, L2, or L3 signaling, such as CSI feedback and/or higher layer signaling.

If at operation 420, the UE determines that a current queue size is less than a desired or predefined threshold, the UE may transmit packets using the assigned NOMA resources of the NOMA region, as shown in operation 450. In some embodiments, the UE may transmit packets using the assigned NOMA resources without an explicit grant from the eNB after determining that the assigned NOMA resources are sufficient to satisfy use of the NOMA region (e.g., the transmission rate is sufficiently low). In other embodiments, the UE may request a grant from the eNB prior to transmitting the data using the NOMA resources.

In some embodiments, the decision at operation 420 may be based on the application used by the UE and/or the specific type of data of the traffic transmitted to the eNB. For example, MTC or VoIP packets or other low latency packets may be transmitted using the assigned NOMA region, while FTP traffic may be sent via one of the OMA regions. The NOMA transmission may be able to reduce latency as well as control signaling overhead in embodiments in which additional procedures for request and/or grant of the uplink resources are avoided due to the UE automatically being able to use the NOMA region resources without an explicit grant from the eNB.

If the current queue size is large than or equal to a desired or predefined threshold, instead of sending data through the assigned NOMA resources, the UE may explicitly request OMA resources, as shown by operation 430. The request for the OMA resources may be made by the UE through a scheduling request transmitted to the eNB using the PUCCH (or PUSCH).

In response to transmitting the scheduling request, the UE may receive a scheduling grant for a set of orthogonal time/frequency (OMA) resources, e.g., to be used only by the UE. The UE may subsequently transmit the buffered data via the assigned OMA resources at operation 440. In some embodiments, the data may be transmitted with an MCS and/or rate assigned by the eNB in the scheduling grant. In some embodiments, the data may be transmitted with a predetermined MCS and/or rate or based on the CQI reported by the UE, the ACK/NACK rate, the current amount of data, and the UE category, among others.

In response to receiving the data from the UE, whether transmitted using OMA or NOMA resources, the eNB may transmit an acknowledgement (ACK) response. In some embodiments, the data transmitted by a UE using NOMA resources in a NOMA region and for which no explicit request has been transmitted by the UE to the eNB, nor a grant received at the UE from the eNB, may not be received by the eNB, for example due to poor channel conditions or conflict between transmissions (i.e., data from multiple UEs overlapping at the eNB). While the use of spreading codes may help in this respect, in some cases it may not be ultimately successful to allow the eNB to decode the individual transmissions from the different UEs. This may lead to the UE failing to receive an ACK response for the data from the eNB. In this case, the UE may employ hybrid automatic repeat request (HARQ) retransmissions.

The UE may take one of a number of actions in the absence of receiving ACK responses from the eNB under the above circumstances. In some embodiments, the UE may retransmit the same data at the next opportunity using the NOMA resources with the same rate/MCS.

The UE may continue to retransmit the data in the same manner using the NOMA resources until a first number of retransmissions has been exceeded without receiving an ACK response from the eNB. After the first number of retransmissions, the UE may continue to retransmit at the next opportunity still using the NOMA resources but using different conditions. In particular, the UE may transmit using a lower rate and/or MCS than the initial transmission of the data. Moreover, in some embodiments, the UE may use Layer 1 packet segmentation when multiple MCSs and NOMA regions (or sub-regions) are configured or predefined. In Layer 1 packet segmentation, the UE may divide one or more of the data packets each into smaller units for transmission. HARQ reconstruction processes at the eNB may enable the eNB to detect missing segments and to request the UE to re-transmit the specific segments. The segmented packets may be transmitted over the same or a different NOMA region.

In some embodiments, after a second number of retransmissions has been exceeded without receiving an ACK response from the eNB, the UE may request that the eNB provide uplink OMA resources for transmission. As above, the request may be based on a scheduling request transmitted to the eNB via the PUCCH or PUSCH. In response, the eNB may transmit a grant of the OMA resources to the UE, which, upon reception of the grant, retransmits the data using the OMA resources. The retransmission may use the rate and MCS of the initial transmission of the data or may use another rate and/or MCS, either of which may be higher or lower than (i.e., independent of) the initial transmission (or retransmission) of the data.

The first and second number of transmissions may be the same or the second number of transmissions may be greater than the first number of transmissions (e.g., the first number of transmissions may be 4 and the second number of transmissions may be 5). The first and second number of transmissions may be predetermined or may depend on one or more dynamic factors. The factors may include the application providing the data, the traffic type, the size of the assigned NOMA region, the channel conditions (e.g., as determined by the measured CQI), the amount of data to transmit, and the UE category, among others. The factors for each of the first and second number of transmissions may be the same or may differ. Although only a first and second number of retransmissions are described, any number of stages may be used in which the MCS, rate, coding, or region used may change.

In some embodiments, back-off mechanisms may also be employed so that the UE may wait for a predetermined amount of time prior to retransmitting the data. As above, the wait time may depend on the above factors and may be the same or may differ dependent on which stage of retransmissions the UE is attempting (e.g., prior to exceeding the first number of retransmissions, after exceeding the first number of retransmissions but prior to exceeding the second number of retransmissions, etc. . . . ).

Example 1 is an apparatus of user equipment (UE) comprising: a transceiver configured to communicate with an enhanced NodeB (eNB) using quasi-orthogonal multiple access (QOMA) resources in QOMA regions, the QOMA regions comprising an orthogonal multiple access (OMA) region and a non-orthogonal multiple access (NOMA) region, the OMA region comprising OMA resources in which UEs are allocated orthogonal resources, the NOMA region comprising NOMA resources in which UEs are allocated non-orthogonal resources; and processing circuitry arranged to: configure the transceiver to receive an allocation of QOMA resources, the QOMA resources comprising the NOMA resources and the OMA resources; configure the transceiver to transmit data using the NOMA resources in response to determining that data to be transmitted meets at least one predetermined condition; and configure the transceiver to transmit data using the OMA resources in response to determining that the data to be transmitted does not meet the at least one predetermined condition.

In Example 2, the subject matter of Example 1 optionally includes that the at least one predetermined condition comprises the data to be transmitted at less than a maximum allowed NOMA rate and the data comprising fewer than a predetermined number of packets.

In Example 3, the subject matter of Example 2 optionally includes that the processing circuitry is arranged to: configure the transceiver to receive, via higher layer signaling including at least one of a Master Information Block, a System Information Block and UE-specific dedicated Radio Resource Control signaling, the allocation of the NOMA resources during initial attachment of the UE with the eNB.

In Example 4, the subject matter of Example 3 optionally includes that the processing circuitry is arranged to: configure the transceiver to receive assignment of at least one of the maximum allowed NOMA rate and a maximum allowed NOMA Modulation and Coding Scheme (MCS) along with allocation of the NOMA resources; and configure the transceiver to refrain from transmitting the data using the NOMA resources above at least one of the maximum allowed NOMA rate and the maximum allowed NOMA MCS.

In Example 5, the subject matter of any one or more of Examples 1-4 optionally includes that the processing circuitry is arranged to: configure the transceiver to transmit the data using the NOMA resources without receiving an explicit grant to transmit the data from the eNB.

In Example 6, the subject matter of any one or more of Examples 1-5 optionally includes that: the OMA and NOMA resources are statically or semi-statistically configured in at least one of a time-division multiplexing (TDM) and a frequency-division multiplexing (FDM) manner In Example 7, the subject matter of any one or more of Examples 1-6 optionally includes that the processing circuitry is arranged to: determine that the data is to be transmitted that does not meet the at least one predetermined condition; configure the transceiver to transmit to the eNB a request for OMA resources to transmit the data in response to determining that the data to be transmitted does not meet the at least one predetermined condition; and configure the transceiver to receive an explicit grant of the OMA resources in response to transmitting the request, the grant comprising one or more time and frequency resources and modulation coding schemes (MCSs) related to the OMA region.

In Example 8, the subject matter of any one or more of Examples 1-7 optionally includes that: the QOMA regions comprise a plurality of NOMA regions, each NOMA region comprising different NOMA resources, and the NOMA resources allocated to the UE are dependent on at least one of UE type, a data type and Quality of Service (QoS) for the UE.

In Example 9, the subject matter of any one or more of Examples 1-8 optionally includes that the processing circuitry is arranged to: retransmit the data using the NOMA resources, using a data rate and Modulation and Coding Scheme (MCS) associated with initial transmission of the data, in response to determining an acknowledgement (ACK) response to the initial transmission of the data has not been received from the eNB.

In Example 10, the subject matter of Example 9 optionally includes that the processing circuitry is arranged to: in response to determining that a first predetermined number of retransmissions has been exceeded without receiving an ACK response from the eNB, retransmit the data using the NOMA resources and at least one of a lower data rate and MCS than the data rate and MCS associated with initial transmission of the data.

In Example 11, the subject matter of Example 10 optionally includes that the processing circuitry is arranged to: in response to determining that a second predetermined number of retransmissions has been exceeded without receiving an ACK response from the eNB, transmit a request to the UE for the OMA resources; and in response to receiving a grant of the OMA resources, retransmitting the data using the OMA resources.

In Example 12, the subject matter of any one or more of Examples 1-11 optionally include, further comprising an antenna configured to transmit and receive communications between the transceiver and the eNB.

Example 13 is an apparatus of an enhanced NodeB (eNB) comprising: a transceiver configured to communicate with a plurality of user equipment (UE) using quasi-orthogonal multiple access (QOMA) resources in QOMA regions, the QOMA regions comprising an orthogonal multiple access (OMA) region and a non-orthogonal multiple access (NOMA) region, the OMA region comprising OMA resources in which UEs are allocated orthogonal resources, the NOMA region comprising NOMA resources in which UEs are allocated non-orthogonal resources; and processing circuitry arranged to: determine a number and partition of the at least one NOMA region; configure the transceiver to transmit an allocation of QOMA resources to each of the plurality of UEs, the QOMA resources comprising the NOMA resources and the OMA resources; and configure the transceiver to receive first data using the NOMA resources from UEs allocated to the NOMA resources, wherein the first data meets at least one predetermined condition.

In Example 14, the subject matter of Example 13 optionally includes that the at least one predetermined condition comprises the data to be transmitted at less than a maximum allowed NOMA rate and the data comprising fewer than a predetermined number of packets.

In Example 15, the subject matter of Example 14 optionally includes that the processing circuitry is arranged to: configure the transceiver to transmit, via higher layer signaling including at least one of a Master Information Block, a System Information Block and UE-specific dedicated Radio Resource Control signaling, the allocation of the NOMA resources during initial attachment of the UE with the eNB.

In Example 16, the subject matter of Example 15 optionally includes that the processing circuitry is arranged to: configure the transceiver to transmit assignment of at least one of the maximum allowed NOMA rate and a maximum allowed NOMA Modulation and Coding Scheme (MCS) along with the allocation of the NOMA resources, wherein the first data is free from data transmitted above the maximum allowed NOMA rate and the maximum allowed NOMA MCS.

In Example 17, the subject matter of any one or more of Examples 13-16 optionally includes that the processing circuitry is arranged to: configure the transceiver to receive the data using the NOMA resources without receiving an explicit grant to transmit the data from the eNB.

In Example 18, the subject matter of any one or more of Examples 13-17 optionally includes that: the QOMA regions comprise a plurality of NOMA regions, each NOMA region comprising different NOMA resources, and the NOMA resources allocated to each UE are dependent on at least one of a UE type, a data type and Quality of Service (QoS) for the UE.

In Example 19, the subject matter of Example 18 optionally includes that the NOMA regions are independent of each other in terms of size and maximum number of UEs able to be allocated thereto.

In Example 20, the subject matter of any one or more of Examples 18-19 optionally includes that the processing circuitry is arranged to: determine a number and partition of the NOMA regions with expected NOMA demand and application type.

In Example 21, the subject matter of any one or more of Examples 18-20 optionally includes that the processing circuitry is arranged to: configure the transceiver to receive a request for the OMA resources from a first UE allocated to use the NOMA resources, in response to receiving the request, transmitting a grant of the OMA resources to the first UE, and re-allocate NOMA resources allocated to the first UE to another UE after transmitting the grant to the first UE.

Example 22 is a non-transitory computer-readable storage medium that stores instructions for execution by one or more processors of a user equipment (UE) to configure the UE to communicate with an enhanced Node B (eNB), the one or more processors to configure the UE to: receive an allocation of quasi-orthogonal multiple access (QOMA) resources in QOMA regions, the QOMA regions comprising an orthogonal multiple access (OMA) region and a non-orthogonal multiple access (NOMA) region, the OMA region comprising OMA resources in which UEs are allocated orthogonal resources, the NOMA region comprising NOMA resources in which UEs are allocated non-orthogonal resources; the QOMA regions comprising an orthogonal multiple access (OMA) region and a non-orthogonal multiple access (NOMA) region, the OMA region comprising OMA resources in which UEs are allocated orthogonal resources and the NOMA region comprising NOMA resources in which UEs are allocated non-orthogonal resources receive assignment of a maximum allowed NOMA rate and a maximum allowed NOMA Modulation and Coding Scheme (MCS); transmit a first set of data using the NOMA resources, the first set of data comprising at most a predetermined number of packets and being transmitted at at most the maximum allowed NOMA rate and the maximum allowed NOMA MCS; and transmit a second set of data using the OMA resources, the second set of data comprising at least one of greater than the predetermined number of packets and transmitted at at least one of greater than the maximum allowed NOMA rate and the maximum allowed NOMA MCS.

In Example 23, the subject matter of Example 22 optionally includes that the UE is configured to: transmit the first data using the NOMA resources without receiving an explicit grant to transmit the first data from the eNB.

In Example 24, the subject matter of any one or more of Examples 22-23 optionally includes that the UE is arranged to: retransmit the first data using the NOMA resources, using a data rate and MCS associated with initial transmission of the first data, in response to determining an acknowledgement (ACK) response to the initial transmission of the first data has not been received from the eNB.

In Example 25, the subject matter of any one or more of Examples 23-24 optionally includes that the UE is arranged to at least one: in response to determining that a first predetermined number of retransmissions has been exceeded without receiving an ACK response from the eNB, retransmit the first data using the NOMA resources and at least one of a lower data rate and MCS than the data rate and MCS associated with the initial transmission of the first data, and in response to determining that a second predetermined number of retransmissions has been exceeded without receiving an ACK response from the eNB, transmit a request to the UE for the OMA resources, and, in response to receiving a grant of the OMA resources, retransmit the data using the OMA resources.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:
1. An apparatus of user equipment (UE) comprising:
   a transceiver configured to communicate with an enhanced NodeB (eNB) using quasi-orthogonal multiple access (QOMA) resources in QOMA regions, the QOMA regions comprising an orthogonal multiple access (OMA) region and a non-orthogonal multiple access (NOMA) region, the OMA region comprising OMA resources in which UEs are allocated orthogonal resources, the NOMA region comprising NOMA resources in which UEs are allocated non-orthogonal resources; and
   processing circuitry arranged to:
      configure the transceiver to receive an allocation of QOMA resources, the QOMA resources comprising the NOMA resources and the OMA resources;
      configure the transceiver to transmit data using the NOMA resources in response to determining that data to be transmitted meets at least one predetermined condition;
      configure the transceiver to transmit data using the OMA resources in response to determining that the data to be transmitted does not meet the at least one predetermined condition; and
      retransmit the data using the NOMA resources, using a data rate and Modulation and Coding Scheme (MCS) associated with initial transmission of the data, in response to determining an acknowledgement (ACK) response to the initial transmission of the data has not been received from the eNB.

2. The apparatus of claim 1, wherein:
the at least one predetermined condition comprises the data to be transmitted at less than a maximum allowed NOMA rate and the data comprising fewer than a predetermined number of packets.

3. The apparatus of claim 2, wherein the processing circuitry is arranged to:
configure the transceiver to receive, via higher layer signaling including at least one of a Master Information Block, a System Information Block and UE-specific dedicated Radio Resource Control signaling, the allocation of the NOMA resources during initial attachment of the UE with the eNB.

4. The apparatus of claim 3, wherein the processing circuitry is arranged to:
configure the transceiver to receive assignment of at least one of the maximum allowed NOMA rate and a maximum allowed NOMA MCS along with allocation of the NOMA resources; and
configure the transceiver to refrain from transmitting the data using the NOMA resources above at least one of the maximum allowed NOMA rate and the maximum allowed NOMA MCS.

5. The apparatus of claim 1, wherein the processing circuitry is arranged to:
configure the transceiver to transmit the data using the NOMA resources without receiving an explicit grant to transmit the data from the eNB.

6. The apparatus of claim 1, wherein:
the OMA and NOMA resources are statically or semi-statistically configured in at least one of a time-division multiplexing (TDM) and a frequency-division multiplexing (FDM) manner.

7. The apparatus of claim 1, wherein the processing circuitry is arranged to:
determine that the data is to be transmitted meets the at least one predetermined condition;
instead of or in addition to configuring the transceiver to transmit data using the NOMA resources, configure the transceiver to transmit to the eNB a request for OMA resources to transmit the data in response to determining that the data to be transmitted meets the at least one predetermined condition; and
configure the transceiver to receive an explicit grant of the OMA resources in response to transmitting the request, the grant comprising one or more time and frequency resources and MCSs related to the OMA region.

8. The apparatus of claim 1, wherein:
the QOMA regions comprise a plurality of NOMA regions, each NOMA region comprising different NOMA resources, and
the NOMA resources allocated to the UE are dependent on at least one of UE type, a data type and Quality of Service (QoS) for the UE.

9. The apparatus of claim 1, wherein the processing circuitry is arranged to:
in response to determining that a first predetermined number of retransmissions has been exceeded without receiving an ACK response from the eNB, retransmit the data using the NOMA resources and at least one of a lower data rate and MCS than the data rate and MCS associated with initial transmission of the data.

10. The apparatus of claim 9, wherein the processing circuitry is arranged to:
in response to determining that a second predetermined number of retransmissions has been exceeded without receiving an ACK response from the eNB, transmit a request to the UE for the OMA resources; and
in response to receiving a grant of the OMA resources, retransmitting the data using the OMA resources.

11. The apparatus of claim 1, further comprising an antenna configured to transmit and receive communications between the transceiver and the eNB.

12. An apparatus of an enhanced NodeB (eNB) comprising:
a transceiver configured to communicate with a plurality of user equipment (UE) using quasi-orthogonal multiple access (QOMA) resources in QOMA regions, the QOMA regions comprising an orthogonal multiple access (OMA) region and a non-orthogonal multiple access (NOMA) region, the OMA region comprising OMA resources in which UEs are allocated orthogonal resources, the NOMA region comprising NOMA resources in which UEs are allocated non-orthogonal resources; and
processing circuitry arranged to:
determine a number and partition of the at least one NOMA region;
configure the transceiver to transmit an allocation of QOMA resources to each of the plurality of UEs, the QOMA resources comprising the NOMA resources and the OMA resources; and
configure the transceiver to receive first data using the NOMA resources from UEs allocated to the NOMA resources if a request for the OMA resources has not been received, wherein the first data meets at least one predetermined conditions;
in response to receiving a request for the OMA resources from a first UE allocated to use the NOMA resources after transmission of the allocation of QOMA resources to the first UE, transmit a grant of the OMA resources to the first UE;
re-allocate NOMA resources allocated to the first UE to another UE after transmitting the grant to the first UE; and
receive data from the first UE on the OMA resources transmitted to the first UE instead of using the NOMA resources.

13. The apparatus of claim 12, wherein:
the at least one predetermined condition comprises the data to be transmitted at less than a maximum allowed NOMA rate and the data comprising fewer than a predetermined number of packets.

14. The apparatus of claim 13, wherein the processing circuitry is arranged to:
configure the transceiver to transmit, via higher layer signaling including at least one of a Master Information Block, a System Information Block and UE-specific dedicated Radio Resource Control signaling, the allocation of the NOMA resources during initial attachment of the UE with the eNB.

15. The apparatus of claim 14, wherein the processing circuitry is arranged to:
configure the transceiver to transmit assignment of at least one of the maximum allowed NOMA rate and a maximum allowed NOMA Modulation and Coding Scheme (MCS) along with the allocation of the NOMA resources,
wherein the first data is free from data transmitted above the maximum allowed NOMA rate and the maximum allowed NOMA MCS.

16. The apparatus of claim 12, wherein the processing circuitry is arranged to:

configure the transceiver to receive the data using the NOMA resources without receiving an explicit grant to transmit the data from the eNB.

17. The apparatus of claim 12, wherein:
the QOMA regions comprise a plurality of NOMA regions, each NOMA region comprising different NOMA resources, and
the NOMA resources allocated to each UE are dependent on at least one of a UE type, a data type and Quality of Service (QoS) for the UE.

18. The apparatus of claim 17, wherein:
the NOMA regions are independent of each other in terms of size and maximum number of UEs able to be allocated thereto.

19. The apparatus of claim 17, wherein:
a number and partition of the NOMA regions varies with expected NOMA demand and application type.

20. A non-transitory computer-readable storage medium that stores instructions for execution by one or more processors of a user equipment (UE) to configure the UE to communicate with an enhanced Node B (eNB), the one or more processors to configure the UE to:
receive an allocation of quasi-orthogonal multiple access (QOMA) resources in QOMA regions, the QOMA regions comprising an orthogonal multiple access (OMA) region and a non-orthogonal multiple access (NOMA) region, the OMA region comprising OMA resources in which UEs are allocated orthogonal resources, the NOMA region comprising NOMA resources in which UEs are allocated non-orthogonal resources;
the QOMA regions comprising an orthogonal multiple access (OMA) region and a non-orthogonal multiple access (NOMA) region, the OMA region comprising OMA resources in which UEs are allocated orthogonal resources and the NOMA region comprising NOMA resources in which UEs are allocated non-orthogonal resources
receive assignment of a maximum allowed NOMA rate and a maximum allowed NOMA Modulation and Coding Scheme (MCS);
transmit a first set of data using the NOMA resources, the first set of data comprising at most a predetermined number of packets and being transmitted at at most the maximum allowed NOMA rate and the maximum allowed NOMA MCS;
transmit a second set of data using the OMA resources, the second set of data comprising at least one of greater than the predetermined number of packets and transmitted at at least one of greater than the maximum allowed NOMA rate and the maximum allowed NOMA MCS; and
retransmit the first data using the NOMA resources, using a data rate and MCS associated with initial transmission of the first data, in response to determining an acknowledgement (ACK) response to the initial transmission of the first data has not been received from the eNB.

21. The medium of claim 20, wherein the UE is configured to:
transmit the first data using the NOMA resources without receiving an explicit grant to transmit the first data from the eNB.

22. The medium of claim 20, wherein the UE is arranged to at least one:
in response to determining that a first predetermined number of retransmissions has been exceeded without receiving an ACK response from the eNB, retransmit the first data using the NOMA resources and at least one of a lower data rate and MCS than the data rate and MCS associated with the initial transmission of the first data, and
in response to determining that a second predetermined number of retransmissions has been exceeded without receiving an ACK response from the eNB, transmit a request to the UE for the OMA resources, and, in response to receiving a grant of the OMA resources, retransmit the data using the OMA resources.

* * * * *